Sept. 15, 1964  H. E. HALL, JR  3,149,230
FORMATION HYDROGEN CONTENT LOGGING WITH FAST
NEUTRON AND SCINTILLATION DETECTOR
Filed June 11, 1959
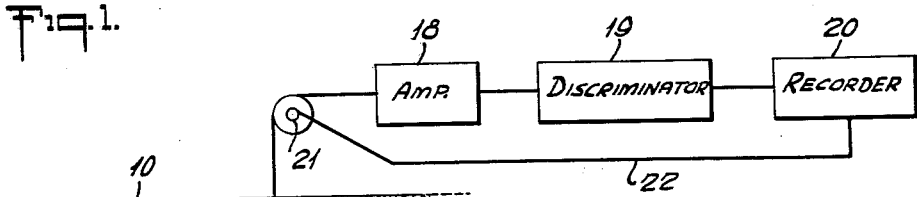
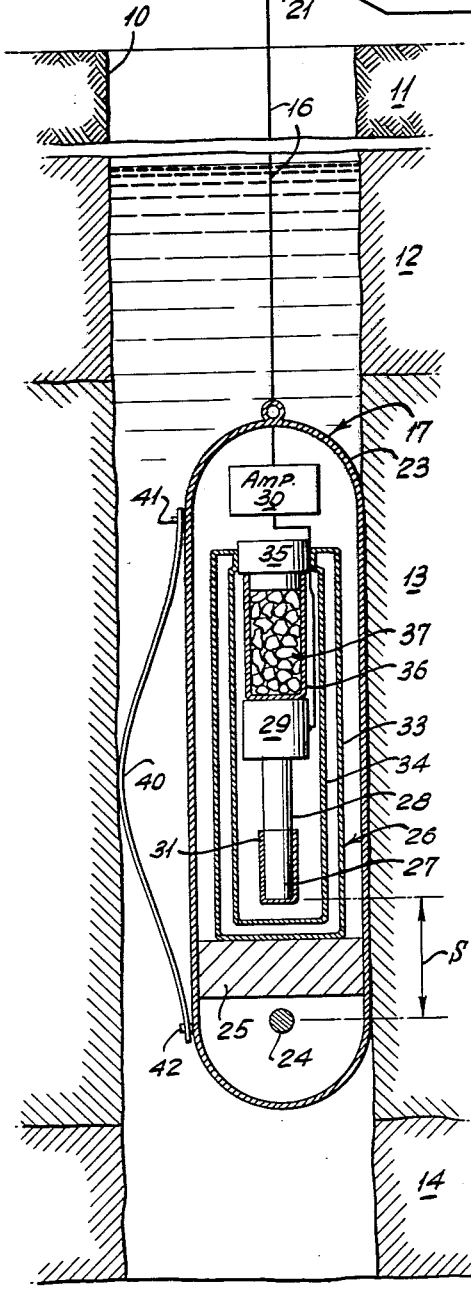

United States Patent Office 3,149,230
Patented Sept. 15, 1964

3,149,230
FORMATION HYDROGEN CONTENT LOGGING
WITH FAST NEUTRON AND SCINTILLATION
DETECTOR
Hugh E. Hall, Jr., Houston, Tex., assignor to Texaco
Inc., New York, N.Y., a corporation of Delaware
Filed June 11, 1959, Ser. No. 819,622
12 Claims. (Cl. 250—71.5)

The present invention relates generally to the determination of the nature of earth formations and more particularly it is concerned with analysis of earth formations along the traverse of a bore hole through irradiation of the formations with neutrons in order to cause observable effects which are detected as an indication of the nature of the earth formations. Accordingly, it is a general object of the present invention to provide improvements in neutronic well logging.

It is well known to analyze earth formations in situ along the traverse of a bore hole through the use of radioactivity analysis techniques involving the measurement of radiation resulting from irradiation of the formation with fast neutrons. These techniques are particularly useful for determining the porosity or hydrogen content of the earth formations. Thus, it is a more specific object of the present invention to provide improvements in methods for measurement of the hydrogen content of earth formations along the traverse of a bore hole by measuring radiation resulting from neutron irradiation of the formations.

The hydrogen content of the formation may be determined by means of a fast neutron source and fast neutron detector by measuring the effect the formation has in slowing down neutrons from the source. Such a log is possible since fast neutrons emitted by the source and which travel toward the fast neutron detector are slowed through collision with intervening elements. The slowing down effect is due almost entirely to the lighter elements, of which hydrogen is the most effective and most predominant in earth formations. In carrying out the log, the fast neutron flux is detected and measured by the fast neutron detector at a predetermined distance from the source. The detected measurement provides an inverse indication of the hydrogen content of the intervening formations. As the hydrogen content of the formation increases, its effectiveness in preventing fast neutrons from reaching the fast neutron detector is more pronounced with a resultant decrease in the fast neutron flux measured at the fast neutron detector. Accordingly, it is a more specific object of the present invention to provide improvements in neutron well logging involving the use of a fast neutron source and detector.

In general, neutronic well logging methods for determining the porosity of earth formations along the traverse of a bore hole are adversely affected by the position of the logging instrument in the bore hole. Accordingly, it is still a further object of the present invention to provide improvements in fast neutron well logging according to which the resultant porosity or hydrogen content measurement is relatively unaffected by the relative positions of the logging instrument in the bore hole during the logging run.

Another problem encountered in fast neutron well logging is that of detecting the fast neutron flux, per se, without undue influence or interference from gamma radiation which may also be present in the bore hole, especially that resulting from irradiation of the formations by the fast neutron source, including that resulting from capture of thermal neutrons. Accordingly, it is still a further object of the present invention to provide improvements in fast neutron well logging involving the use of a fast neutron detector which is relatively insensitive to gamma radiation.

Briefly stated, the present invention is concerned with improvements in fast neutron well logging wherein a source of fast neutrons and a fast neutron detector are mounted within an elongated logging instrument with the source and detector spaced from one another along the principal axis thereof a predetermined distance. The spacing between the source and detector is chosen so that the fast neutron flux reaching the detector as a result of irradiation of earth formations is relatively unaffected by the position of the logging instrument in the bore hole. The detector is relatively insensitive to gamma radiation which may be present along with the detected fast neutron flux. Preferably, this is accomplished by the use of a fast neutron source and a scintillation type detector including a luminophor comprising a calcium fluoride crystal and wherein the scintillation detector is biased to eliminate electrons below a predetermined energy level, whereby higher energy electrons resulting from fast neutrons interacting with the luminophor will be selectively detected to the exclusion of lower energy radiation due to gamma radiation.

For additional objects and advantages and for a better understanding of the invention, attention is directed to the following description and accompanying drawings. The features of the invention which are believed to be novel are pointed out in the appended claims.

In the drawings:

FIG. 1 is a schematic representation showing a side elevational view through a portion of a bore hole having a well logging instrument suspended therein and which is constructed in accordance with principles of the invention; and, FIG. 1a is a schematic representation showing a perspective view of another form of luminophor which may be used with the apparatus of FIG. 1 in place of the luminophor illustrated in that figure; and, FIG. 1b is a schematic representation showing a perspective view of still another form of luminophor which may be used with the apparatus of FIG. 1 in place of the luminophor illustrated in that figure.

Referring now to FIG. 1 of the drawings, there is shown a bore hole 10 traversing a plurality of earth formations 11, 12, 13 and 14 and containing a fluid 15 which may comprise the usual drilling fluid, water or crude oil, for example. Suspended within the bore hole 10 as by means of a cable 16, there is shown a well logging instrument 17 constructed in accordance with principles of the invention. The cable 16 may include an outer conductive sheath together with one or more additional inner conductors (not individually shown) in order to afford means for transmitting electrical signals between the instrument 17 and electrical aparatus at the surface of the earth.

The surface equipment provides a means for receiving signals transmitted from the logging instrument 16 and amplifying and otherwise translating the received signals as necessary for recording purposes. The surface apparatus includes an amplifier 18 having its input side connected to the cable 16 and having its output side connected to a pulse height analysis or discriminator 19. The output path from the discriminator 19 leads to a display device in the form of a recorder 20. It is to be understood that the recorder 20 includes rate-meter circuitry as necessary for providing a record of the intensity, i.e. rate-of-occurrence of detected radiation. It is also to be understood that although the discriminator 19 is shown as part of the surface equipment, it may preferably be included as part of the equipment contained within the logging instrument 17.

In order to correlate the position of the logging instrument 17 in the bore hole 10 during a well log, there is provided at the surface a measuring apparatus 21, represented diagrammatically as a wheel having its perimeter in contact with the cable 16 for sensing movement of the cable 16 in and out of the bore hole 10. The measuring apparatus 21 may be any known device of this type suitable for determining the position of the logging instrument 17 in the bore hole 10 and advanageously may be of a type which provides an electrical output signal which may be transmitted as by means of the conductive circuit 22 to the recorder 20 for correlating the recorded logging signal with the position of the logging instrument 17 in the bore hole 10 throughout a well log.

Logging instrument 17 comprises an elongated outer shell-like housing or casing 23 formed conventionally of steel in accordance with known techniques to withstand the pressures and temperatures commonly encountered in the well logging art. Advantageously, the housing should be of such character as to withstand the conditions that may be found in a bore hole upwards of 10,000 to 20,000 feet in depth. The casing 23 contains a fast neutron source 24 for bombarding the earth formations along the bore hole, together with appropriate radiation detection equipment for detecting fast neutrons from the formation as the result of irradiation by the source 24. Appropriate electrical circuitry is also enclosed within the casing 23 for amplifying and otherwise handling the output signals from the radiation detection equipment for transmission over the cable 16 to the surface equipment. In particular, the neutron source 24 is shown positioned within the housing 23 near the lower end thereof and having positioned immediately above it, a gamma ray shield 25 formed of lead or tungsten, for example, to prevent gamma radiation which may also be emitted by the source from passing to the detection equipment. Also within the housing 23 above the shield 25 and spaced a predetermined distance from the source 24, there is positioned a radiation detection unit 26 which, together with its associated circuitry, is adapted and arranged to provide an output signal that is proportional to the intensity of detected fast neutron radiation resulting from neutrons emitted by the source. The detection unit 26 is constructed in accordance with principles of the invention so that it provides an output signal which is significantly proportional to the hydrogen content of the earth formation bombarded by neutrons from the source.

The detector unit 26 comprises a scintillation detector including a neutron sensitive luminophor 27, advantageously in the form of a calcium fluoride crystal, together with a photomultiplier tube 28, shown mounted adjacent the luminophor 27 for detecting the output pulses from the luminophor and providing an electrical signal proportional thereto. The photomultiplier tube 28 is, in turn, shown adjacent a preamplifier 29, identified schematically and, in turn, is show electrically connected to additional electrical equipment identified as an amplifier 30 for transmission of output signals derived from the photomultiplier tube 28 to the surface equipment by means of the cable 16. It is to be understood that the photomultiplier tube is energized by means of a high voltage source (not shown) which may comprise batteries positioned in the logging instrument 17, or, more conventionally, may involve the use of power supply equipment (not shown) including a transformer and rectifier in the logging instrument for deriving appropriate high direct current operating potential from alternating power transmitted from the surface to the logging instrument in the bore hole. It is to be further understood that the amplifier 30 may actually include any additional circuitry required for handling the transmission of the signal information to the surface in accordance with principles well known in the art. For example, the radiation detector signals may be transmitted to the surface as amplitude modulated signals or may be transmitted in the form of frequency modulated signals in accordance with well known techniques. As is well known to those skilled in the art, filter means may also be provided for separating electrical power transmitted from the surface to the equipment in the logging instrument from the electrical signals which are transmitted from the logging instrument to the surface equipment.

The luminophor 27 is shown mounted within an aluminum container 31 which serves to protect it from moisture and physical damage. The upper end of the container 31 facing the photomultiplier tube 28 is shown as open, with the luminophor 27 in direct contact with the sensitive face of the photomultiplier tube 28. However, it is to be understood that the container 31 may be sealed with a transparent cover of glass or plastic in a manner well known in the art.

In order to stabilize and protect the scintillation logging equipment against the effect of high bore hole temperatures, and variations thereof, the luminophor and photomultiplier tube, as well as the preamplifier are all shown mounted within an insulated chamber preferably in the form of a Dewar flask comprising an outer wall 33 separated from an inner wall 34 by an evacuated space. The insulated chamber is provided with an appropriate removable insulating plug 35 of cork or other insulated material. Within the Dewar flask advantageously affixed to the inside of the insulated cover plug 35, there is provided a coolant chamber 36 having thermally conductive walls, as of thin aluminum, and containing a quantity of ice 37. The coolant chamber including the ice 37 affords means for maintaining the scintillation detection equipment in a stable, relatively low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted February 18, 1958, to Gerhard Herzog.

Although aspects of this invention are directed to improvements whereby the radiation log is relatively insensitive to the position of the logging instrument in the bore hole, nevertheless, in certain instances, means may also be provided to stabilize the position of the logging instrument throughout a logging run, such as the decentralizing bow spring 40, having its upper and lower ends 41 and 42 mounted to the logging instrument 17 in such manner that the spring is free to flex as the instrument is moved past irregularities in the side of the bore hole. Conventionally, this may be achieved by mounting the upper and lower ends of the bow spring 40 in slidably engageable relationship to the instrument 17, as by means of elongated slots (not shown) in the bow spring 40.

In order to reduce the effect on the log of variations in the position of the logging instrument relative to the sides of the bore hole during the logging run, the spacing S between the fast neutron source and the near side of the luminophor of the scintillation detector should be a predetermined distance. A predetermined optimum distance may be arrived at in view of the fact that at relatively long spacings between the source and detector the fast neutron flux at the detector increases when the logging tool is moved away from the side of the bore hole. This is because there will be increased scattering of neutrons from the source to the detector. However, with a much shorter spacing between the source and detector when the tool is moved away from the formation there will be more scattering in the forward direction away from the detector, hence the radiation flux impinging on the detector will decrease. At an intermediate preferred spacing the logging tool may be moved away from the side of the formation with a minimum change in the response of the fast neutron logging signal. It has been found experimentally that using a 200 milligram Ra:Be source of fast neutrons and a 4″ long x 2″ diameter detector the optimum distance is of the order of 19 inches between source and detector.

In order to assure that the fast neutron log according to the present invention is relatively insensitive to the gamma radiation which may also be present along with the fast neutrons in the vicinity of the detector it is contemplated that the luminophor of the scintillation detector should comprise an unactivated calcium fluoride crystal and that the discriminator associated with the scintillation detector should be biased to exclude electrons below a predetermined lower energy, whereby the detector is rendered sensitive to electrons resulting from interaction of fast neutrons with the calcium fluoride crystal while excluding lower energy rays resulting from interaction of gamma rays with the detector crystal.

The basis for the method is the $F^{19}(n, \alpha)N^{16}$ reaction. $N^{16}$ decays with a 7.3 second half-life to the ground state of $O^{16}$ through a beta-transition, 18% of the time giving a beta with a maximum energy of 10.4 mev., with the remainder of the transitions going to the 6.13 and 7.1 mev. levels of $O^{16}$. These last two levels decay to the ground state through gamma emission. The cross-section for this reaction has a practical threshold of 3.1 mev. for the detected fast neutrons and reaches a broad maximum at 5.9 mev. of 280 milli-barns. The reaction

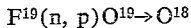

has a threshold of 4.6 mev. for the detected fast neutrons, a half-life of 29 seconds and maximum energy beta of 4.5 mev.

In view of the 3.1 mev. fast neutron threshold for the $F^{19}(n, \alpha)N^{16}$ reaction, the energy of the fast neutrons from the source should be at least about 3.7 mev.

The discriminator associated with the detector may be biased to accept pulses corresponding to an electron energy of 10 mev. and above. This includes any 10.4 mev. electrons resulting from the $F^{19}(n, \alpha)N^{16}$ reaction and excludes most interfering gamma radiation. The electrons from $N^{16}$ have a $4\pi$ geometry and have a 100% efficiency for producing light pulses.

It is also contemplated in accordance wih a further aspect of the invention that the discriminator may be biased to accept electrons corresponding to an energy level of 8 mev. and above. This bias will include the detection of the electrons emitted in the ground state transition from the $F^{19}(n, \alpha)N^{16}$ reaction, and in addition will include some of the betas which are in coincidence with the 6.1 and 7.1 mev. $\gamma$ radiations from the decay of $O^{16}$ to the ground state. Although these gamma rays are of 6.14 and 7.1 mev. energy, they originate inside the crystal. Thus, they have a $4\pi$ geometry and would give a total light pulse-out of higher than 8 mev. part of the time. This aspect of the invention is not equivalent to the use of a bias of the order of 10 mev. as described above. In particular the 8 mev. bias affords a higher fast neutron signal, but the 10 mev. bias is more effective in eliminating high energy gamma radiation from the desired signal. In well logging, high energy gamma radiation is emitted upon capture of a neutron by chlorine, for example, and may cause undesirable background interference with the fast neutron log unless the detector is biased to exclude such radiation.

The 7.3 second half-life of $N^{16}$ indicates that the overall system should advantageously have a minimum time constant of 7.3 seconds for a reasonable counting rate.

In accordance with another aspect of the invention for minimizing the effect of gamma radiation on the detected fast neutron flux it is contemplated to employ a luminophor such as that illustrated in FIG. 1a comprising a plurality of spheres of hydrogen-containing luminophor material, such as Pilot B manufactured by Pilot Chemical Company.

The respective spheres are of sufficiently small diameter that a fairly low energy electron will pass completely through the sphere but a recoil proton from a high energy neutron will be stopped by the sphere, causing a scintillation. A .10" plastic sphere will count recoil protons of 4 to 5 mev. in energy but an 800 kev. electron will pass completely through such a sphere. Due to the difference in light conversion efficiencies, the 800 kev. electron light pulse is the same as a 2.5 mev. recoil proton. Thus neutrons above 2.5 mev. energy may be counted with a very low gamma sensitivity. When a plurality of such small crystals are employed the spheres must be separated in such manner that a fast electron will lose its energy between spheres rather than in one of them. This can be accomplished by placing electron attenuating material between the respective spheres. The electron attenuating material, should, nevertheless, transmit the scintillations from the luminophor to the photomultiplier device and may comprise quartz or liquid Kel-F. A quartz spacer .4" thick will eliminate the possibility of two spheres scintillating from a 5 mev. electron.

In well logging the spheres should advantageously be placed at such a distance from one another as to eliminate electrons of 3 to 4 mev. and still be sensitive to the high energy gamma rays. This is because of the number of gamma rays present in comparison to the number of fast electrons.

It is further contemplated that principles of this aspect of the invention may be carried out by employing a luminophor in the form of a sandwich-like structure comprising a plurality of thin layers or sheets alternately formed of scintillating material and material such as quartz which stops the electrons between the luminophor layers. The photomultiplier may be positioned facing the respective ends of the sheets for detecting the resultant light pulses. Aspects of this invention are illustrated in FIG. 1b.

Among the advantages of the invention is the elimination of the effect of variations in size of the bore hole upon the fast neutron log since the bore hole fluid functions, in effect, as a shield for neutrons traveling in the bore hole from the source toward the detector. This advantage of the invention preferably involves the use of the discriminator for preventing the detection of fast neutrons below a predetermined minimum energy level. In particular, the discriminator is set so that substantially none of the fast neutrons which pass from the source directly through the well fluid to the detector will be detected. Since the well fluid is substantially water or oil its ability to slow down the fast neutrons from the source is very effective. Even in relatively porous earth formations that are highly saturated with oil or water, the hydrogen concentration per unit volume will be significantly lower than the hydrogen concentration in water or oil of corresponding volume. Thus, by spacing the source and detector away from one another along the axis of the bore hole it is possible to establish the detector bias so that none of the fast neutrons passing through the fluid column in the bore hole will be detected and measured. However, those neutrons passing from the source into the formation are able to travel a greater distance before being thermalized and captured than those which pass through the well fluid. Some of the fast neutrons transmitted into the formation will be of relatively high energy upon reaching the detector as compared with those which pass directly through the well fluid. Thus, the detector may be rendered sensitive to fast neutrons in a range of energy relatively close to the source energy and which excludes those lower energy neutrons which are degraded in energy as they pass through the well fluid to the detector.

The neutron source 26 may be of known type including those comprising an alpha ray emitter and a target material which emits neutrons in response to the alpha rays. For example, the alpha emitter may include radium, polonium, radium D, actinium 227 or plutonium and the target may include beryllium. While certain of the above sources such as radium-beryllium emit a substantial gamma ray flux along with the fast neutron radiation, certain others of the above sources, especially those employing atcinium 227 or plutonium as the source of alpha rays, has a significantly lower gamma ray emission and therefore reduces the problem of eliminating unwanted gamma ray background radiation. It is also contemplated in accordance with the present invention that the fast neutron source may advantageously comprise an electronic device such as those wherein charged particles are accelerated against a target marteial to cause the neutron emission. This device may operate by causing charged particles such as deuterons to strike a suitable target material such as tritium. Such sources of neutrons are advantageous in carrying out the present invention since they may be constructed to emit substantially mono-energetic fast neutrons as compared with the relatively broad spectrum emission of a neutron source such as radium-beryllium or the like.

The electronic type neutron sources also afford the advantage that they may be selectively switched on or off or pulsed. Between neutron pulses, after the neutron capture gammas have ceased (approximately 1000 microseconds), the detector could be turned on and the bias set at approximately 3 mev. This would allow a high efficiency for detecting the beta rays from $O^{17}$. One would then measure until the beginning of the next neutron pulse.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a radioactivity well log of the formations traversed by a bore hole through the earth comprising an elongated instrument adapted to be passed through a bore hole, said instrument including a source of fast neutrons for irradiating the formations along the traverse of the bore hole and a detector of fast neutrons resulting from irradiation of adjacent earth formation by neutrons from said source, said source and detector being spaced a predetermined distance from one another along the longitudinal axis of said instrument, said predetermined distance being that distance at which the fast neutron flux reaching the detector as a result of said source is least affected by the position of the instrument in the bore hole and being such that the fast neutron flux reaching the detector in response to movement of the instrument away from the side of the bore hole increases at longer source-to-detector spacings due to increased scattering by bore hole fluid between the detector and the side of the bore hole and decreases at shorter source-to-detector spacings due to increased scattering in the forward direction away from the detector.

2. Apparatus according to claim 1, further comprising means for stabilizing the position of said logging instrument relative to the sides of the bore hole as the instrument is moved through the bore hole.

3. Apparatus according to claim 2, wherein said stabilizing means comprise resilient decentralizing means for maintaining the logging instrument continuously urged against a predetermined side of the bore hole as the instrument is passed through the bore hole.

4. In apparatus for conducting a radioactivity well log of the earth formations traversed by a bore hole comprising an instrument including a source of fast neutrons for irradiating the earth formations along the bore hole and a detector of fast neutrons emitted from the earth formations as a result of irradiation by fast neutrons from said source, the improvement wherein said fast neutron detector comprises a scintillation type detector including a calcium fluoride luminophor, said detector being biased to exclude lower energy electrons below a predetermined energy level of the order of 10 million electron volts whereby higher energy electrons resulting from fast neutrons interacting with the luminophor will be selectively detected to the exclusion of lower energy radiation due to gamma radiation.

5. In apparatus for conducting a radioactivity well log of the earth formations traversed by a bore hole comprising an instrument including a source of fast neutrons for irradiating the earth formations along the bore hole and a detector of fast neutrons emitted from the earth formations as a result of irradiation by fast neutrons from said source, the improvement wherein said fast neutron detector comprises a scintillation type detector including a luminophor comprising a plurality of elements of hydrogenous luminophor material of sufficient thickness in a predetermined dimension to produce scintillations in response to recoil protons resulting from interaction of fast neutrons with the hydrogen therein and said predetermined dimension being sufficiently thin to permit relatively low energy electrons due to interaction of gamma radiation in said luminophor to pass completely therethrough and electron absorption means comprising a layer of fast neutron permeable material positioned between the respective luminophor elements.

6. In apparatus for conducting a radioactivity well log of the earth formations traversed by a bore hole comprising an instrument including a source of fast neutrons for irradiating the earth formations along the bore hole and a detector of fast neutrons emitted from the earth formations as a result of irradiation by fast neutrons from said source, the improvement wherein said fast neutron detector comprises a scintillation type detector including a luminophor comprising a plurality of substantially spherical elements of hydrogenous luminophor material of sufficient diameter to produce scintillations in a predetermined dimension in response to recoil protons resulting from interaction of fast neutrons with the hydrogen therein, said predetermined diameter being sufficiently thin to permit relatively low energy electrons due to interaction of gamma radiation in said luminophor to pass completely therethrough and electron absorption means comprising a transparent layer of fast neutron permeable material positioned between the respective luminophor elements.

7. In apparatus for conducting a radioactivity well log of the earth formations traversed by a bore hole comprising an instrument including a source of fast neutrons for irradiating the earth formations along the bore hole and a detector of fast neutrons emitted from the earth formations as a result of irradiation by fast neutrons from said source, the improvement wherein said fast neutron detector comprises a scintillation type detector including a luminophor comprising a plurality of substantially sheet-like elements of hydrogenous luminophor material of sufficient thickness to produce scintillations in response to recoil protons resulting from interaction of fast neutrons with the hydrogen therein, said sheets being sufficiently thin to permit relatively low energy electrons due to interaction of gamma radiation in said luminophor to pass completely therethrough and electron absorption means comprising a layer of fast neutron permeable material positioned between the respective luminophor elements.

8. In the method of radioactivity well logging wherein a source of fast neutrons is passed through a bore hole containing an hydrogenous fluid to irradiate the earth formations along the traverse of the bore hole and a detector of fast neutrons is simultaneously passed through the bore hole to detect and measure fast neutron radiation coming from the formation as the result of irradiation thereof by said source, the improvement wherein the effect of variations in the size of the bore hole upon the fast neutron log is substantially eliminated by maintaining the source and detector spaced from one another along the axis of the bore hole, maintaining the source and detector decentralized in the bore hole by pressing the source and detector against the same side of the bore hole as they are passed through the bore hole, and biasing the fast neutron detector to exclude from the detected signal substantially all neutrons below a predetermined minimum energy level as determined by the upper energy level of the significant neutron radiation arriving at the detector by passing directly through the well fluid from the source, whereby substantially only fast neutrons passing through the formation to the detector will be detected to the exclusion of substantially all lower energy neutrons which are degraded below said predetermined energy level in passing through the well fluid of the bore hole from the source to the detector.

9. Apparatus in accordance with claim 1 wherein the fast neutron source emits a neutron flux having a magnitude of the order of that of a 200 milligram radium-beryllium source, wherein the detector has a length of the order of 4 inches and wherein the distance from the source to the detector is of the order of 19 inches.

10. In the method of radioactivity well logging wherein a source of fast neutrons is passed through a bore hole containing an hydrogenous fluid to irradiate the earth formations along the traverse of the bore hole and a detector of fast neutrons is simultaneously passed through the bore hole to detect and measure fast neutron radiation coming from the formation as the result of irradiation thereof by said source, the improvement wherein variations in the resulting log due to the effect of the position of the detector in the bore hole relative to the side of the bore hole is minimized during the course of the log by maintaining the source spaced from the detector a predetermined distance, said predetermined distance being that at which the fast neutron flux reaching the detector in response to movement of the detector away from the side of the bore hole increases due to increased scattering by bore hole fluid between the detector and the side of the bore hole and decreases at shorter source-to-detector spacings due to increased scattering of the neutrons in the forward direction away from the detector at said shorter spacing.

11. Apparatus according to claim 1 wherein the neutron source is of the electronic type adapted and arranged to be pulsedly operated.

12. Apparatus as defined in claim 4 wherein the radiation detection system has a time constant of at least about 7.3 seconds.

References Cited in the file of this patent
UNITED STATES PATENTS

| | | |
|---|---|---|
| 2,344,042 | Kallmann et al. | Mar. 14, 1944 |
| 2,616,052 | Hurst | Oct. 28, 1952 |
| 2,648,012 | Scherbatskoy | Aug. 4, 1953 |
| 2,697,181 | Sheldon | Dec. 14, 1954 |
| 2,711,482 | Goodman | June 21, 1955 |
| 2,712,081 | Fearon et al. | June 28, 1955 |
| 2,727,155 | Herzog et al. | Dec. 13, 1955 |
| 2,768,307 | Tirico | Oct. 23, 1956 |
| 2,795,703 | Berlman et al. | June 11, 1957 |
| 2,799,780 | Ruderman | July 16, 1957 |
| 2,854,584 | Youmans | Sept. 30, 1958 |
| 2,867,728 | Pollock | Jan. 6, 1959 |
| 2,882,417 | Johnson | Apr. 14, 1959 |
| 2,910,592 | Armistead | Oct. 27, 1959 |
| 2,963,586 | Richard | Dec. 6, 1960 |
| 2,991,363 | Rosenthal | July 4, 1961 |
| 3,047,720 | Rickard | July 31, 1962 |

OTHER REFERENCES

Emmerich: A Fast Neutron Scintillator, The Review of Scienticc Instruments, January 1954, pp. 69 and 70.